UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

PIGMENT AND PAINT.

1,218,161.      Specification of Letters Patent.      Patented Mar. 6, 1917.

No Drawing.      Application filed March 21, 1916. Serial No. 85,562.

*To all whom it may concern:*

Be it known that I, LOUIS E. BARTON, a citizen of the United States, and a resident of Niagara Falls, in the county of Niagara and State of New York, have invented certain new and useful Improvements in Pigments and Paints, of which the following is a specification.

My present invention relates to pigments, more particularly to those used in paints, and specifically to those containing such so-called "composite titanic oxid pigments," for which Letters Patent No. 1,155,462 were granted me October 5th, 1915, and the objects of my present invention comprise provision of procedures and means whereby in certain respects paints containing such composite pigments may, for certain uses, and under certain conditions, be improved.

The enormous extent of natural deposits of titanic oxid being long known, it has accordingly been sought, though unsuccessfully, to make use of that compound as a pigment in paints as, for example, either in the form of natural rutile, or combined with iron oxids, in colored pigments.

The difficulty and expense of industrially separating such titanic oxid in required purity and quantity from undesired substances therewith intermingled in nature, such as iron and gangue, have long prohibited such use of titanic oxid in paint. Notwithstanding the comparatively recent advent of cheaper and better methods of concentration, the titanic oxid products of the earlier of these failed, in paints, for various reasons including their crystalline and too gritty character and comparative inability to impart to paint the unsurpassed hiding powers since developed by aid of titanic oxid. It is only quite recently that methods have been invented resulting in purer concentrates, the titanic oxid of which is in amorphous state and chemically uncombined with other substances, such methods being those, for instance, claimed in Letters Patent Nos. 1,106,406, 1,106,407, 1,106,408, 1,106,409, and 1,106,410, granted to Auguste J. Rossi and myself on August 14, 1914. While such last mentioned titanic oxid concentrates are very useful for many purposes, including pigments in paints, their hiding power in the latter has been surpassed by the above referred to "composite titanic oxid pigments," the which are, as per the claims of said Patent No. 1,155,462, distinguished from prior products as comprising titanic oxid and a sulfate, or, more particularly, particles of a sulfate base, or extender, having thereto-adhering, or therewith coalesced, smaller particles of titanic oxid, and one of my methods for producing which as by precipitation, etc., are set forth in the said last mentioned Letters Patent.

My researches, and experiments on industrial scales, have, however, resulted in demonstrating that, notwithstanding that much greater hiding power is impartable to paints by my said composite titanic oxid pigments as compared with any other forms of titanic oxid, or other titanic oxid pigments, or any other pigments such as white lead or zinc oxid, known to me; and notwithstanding the many other superior properties of my said composite pigments for the purpose, they cannot, in some instances, be employed as the sole, or preponderating, pigment constituent of paints without development of faults in final results which are more or less undesirable, if not sometimes prohibitory.

For example, such paints prepared, spread and dried in the usual manner, have, in too many instances, been found to retain too long, if not indefinitely, a sticky, or, as termed in the art, a "tacky," exterior film by which were caught, and to which adhered, particles of dust or other undesired matter with consequent soiling or discoloration of the paint surface. On the other hand, some of such paints, after exposure to the air so long as to become completely hardened, began to disintegrate, or, as it is termed in the art, "chalk," on the surface, the rubbing of which, as by usual cleansing or other wear, removed such disintegrated portions, exposing underlying particles to similar disintegration, by which the coat of paint might be undesirably reduced in thickness or ultimately altogether removed.

I have discovered that the above mentioned difficulties and faults, and others, can be overcome by thoroughly mixing with my said composite titanic oxid pigments a relatively small quantity of white lead, *i. e.*, basic carbonate of lead.

Such intermixed additions to my composite titanic oxid pigments can be made at any time or in any convenient manner, but I find that the best results are attained by as intimately and homogeneously as possible mixing the white lead with such composite titanic oxid pigment prior to being worked up for paint with the usual vehicles, and to this end I first thoroughly grind together said composite pigment and the white lead preferably in their dry state, after which they are still more intimately mixed by the usual grinding together with oil to bring the product into the paste form in which paint is usually marketed preparatory to its being further manipulated into condition suitable for immediate use, as by the customary further incorporation of said vehicles such as oils, driers, thinners, or varnish, etc. The added white lead, may, however, though unpreferably, be incorporated by mixing or grinding together preliminarily, separately, prepared pastes, the one containing it and the other the composite titanic oxid pigments, or it may even be introduced during the final reduction with said vehicles of the paint containing the composite titanic oxid pigment.

The proportions of the white lead so added to my composite titanic oxid pigments for the purposes specified should, in each case, be determined upon consideration of the conditions under which the paint is to be finally used.

Thus, for example, to prevent chalking, if the paint is to be exposed to sunlight and weather, as in out-of-doors painting, the addition of white lead, should be as much as from 15% to 25% calculated on the combination thereof with my composite titanic oxid pigment, while for interior painting from 15% to 5%, or sometimes even less, I find to be sufficient. As preventing tackiness, an addition of 5% to 10% gives excellent results if the paint is spread under favorable drying conditions, as in average summer weather. In exceptionally warm, dry, weather, even such small amounts as 2% to 5% are efficient, but in cool, damp weather, as in early spring, or fall, and generally during the winter, it is advisable to use from 10% to 20%.

Experiments have demonstrated that the various well known, including liquid, driers cannot be relied upon to overcome the sometimes unsatisfactory behaviors referred to of paints containing my composite titanic oxid pigments.

The nature of the material upon which the paint is to be spread should also be taken into account in determining the proportions of the said additions of white lead to my composite titanic oxid pigments, a larger addition being usually required to prevent chalking on wood than on metal, such as structural steel, for example.

Those skilled in the paint art will readily determine the proportions best suited to each particular case, the rule being to restrict the addition to as little as compatible with attainment of its aforesaid specific beneficial effects, since in other respects, while increasing cost, it is of little value, or even sometimes detrimental to obtaining the distinguishing hiding power, or other, beneficial characteristics, in paint, which are peculiarly attributable to my said composite titanic oxid pigments; and it will be understood that by, as above, mentioning proportions which I believe to be, in certain cases, most effective, I do not thereby, nor thereto, limit my invention.

What I claim as my invention and desire to secure by Letters Patent is the following:

1. Paint containing a pigment comprising titanic oxid and a sulfate mixed with white lead.

2. Paint containing a pigment comprising particles of a sulfate base and thereto-adhering smaller particles of titanic oxid mixed with white lead.

3. As a new article a composite pigment comprising titanic oxid and a sulfate mixed with white lead.

4. As a new article a composite pigment comprising particles of a sulfate base and thereto-adhering smaller particles of titanic oxid mixed with white lead.

LOUIS E. BARTON.

Witnesses:
  B. C. POTTER,
  ROBERT P. EASTON.